United States Patent [19]

Schaltenbrand

[11] 3,766,712

[45] Oct. 23, 1973

[54] FABRIC TUBE TYPE DUST COLLECTOR METHOD

[75] Inventor: Eugene D. Schaltenbrand, Louisville, Ky.

[73] Assignee: American Air Filter Company, Inc., Louisville, Ky.

[22] Filed: Dec. 14, 1971

[21] Appl. No.: 207,786

[52] U.S. Cl............................ 55/96, 55/302, 55/341, 55/360
[51] Int. Cl.............................................. B01d 46/04
[58] Field of Search ................. 55/96, 97, 103, 291, 55/302, 303, 341, 360

[56] References Cited
UNITED STATES PATENTS

| | | |
|---|---|---|
| 1,574,422 | 2/1926 | Feind .................................. 55/360 |
| 1,628,601 | 5/1927 | Feind .................................... 55/96 |
| 1,784,339 | 12/1930 | Clasen et al. ......................... 55/228 |
| 3,057,137 | 10/1962 | Perlis et al. ........................... 55/303 |
| 3,217,468 | 11/1965 | O'Dell ................................... 55/96 |

*Primary Examiner*—Bernard Nozick
*Attorney*—Robert W. Fletcher et al.

[57] ABSTRACT

An arrangement for removing contaminant particles from a gas stream which includes providing a preselected null period during which time charges on the fabric tubes of a tube type dust collector are allowed to dissipate thereby facilitating cleaning thereof.

4 Claims, 2 Drawing Figures

PATENTED OCT 23 1973 3,766,712

FABRIC TUBE TYPE DUST COLLECTOR METHOD

BACKGROUND OF THE INVENTION

Gas pervious fabric tube type dust collectors have long been known in the gas cleaning industry as effective in removing various industrial air pollutant materials. Dirty gas streams to be treated have been passed through gas pervious fabric tubular collectors so that contaminant particles in the streams have been removed by the gas pervious fabrics, the contaminant particles collecting in cakes on the internal surfaces of the fabric tubes. To periodically remove caked collected contaminant particles from the tubes so as to maintain appropriate gas cleaning efficiencies, the fabric tubes have either been shaken with complex and expensive shaker mechanisms or have been collapsed and re-inflated to break and dislodge the cakes of contaminant particles. Although past arrangements for collapsing and reinflating the fabric tubes have proven reasonably efficient when compared to shaker type tube cleaners the present invention recognizes that these past arrangements have been somewhat inefficient. This inefficiency in accordance with the present invention was discovered to stem from the fact that static electrical charges were built up, upon the surfaces of the fabric tubes of the tube type collectors which in turn caused charged contaminant particles to be attracted to and held thereon. The arrangement of the present invention solves the above-mentioned problem to provide a gas cleaning arrangement which can be utilized where greater efficiencies are desired and where high temperature operation is a factor, such as in the cement, steel, or carbon industries.

SUMMARY OF THE INVENTION

With the arrangement of the present invention static electrical charges on the surfaces of the fabric tubes are dissipated before the cleaning cycle is initiated, thereby increasing the efficiency of the cleaning cycle. More specifically, the present invention provides a method of collecting contaminant particles from a dirty gas stream including the cycle steps of passing the gas stream through a system defined passageway which includes passing the gas stream into an open end of and through the walls of at least one gas pervious fabric tubular collector at a pressure and velocity sufficient to maintain the fabric tube in inflated form with the contaminant particles in the dirty gas stream collecting on the surface of the walls of the fabric tubular collector; thereafter cleaning the collector in a cleaning cycle wherein the cleaning cycle comprises stopping the flow of the dirty gas stream into the fabric tubular collector by isolating the fabric tube from the incoming dirty gas stream when a cake of contaminant particles has collected on the surface of the walls thereof; providing a preselected null period to allow static electrical charges built up on the walls of the fabric tube to dissipate to ground; passing a clean gas stream in a reverse direction through the isolated tube at sufficient pressure and velocity and for a sufficient time interval during the cleaning cycle to at least partially collapse the fabric tube of the tubular collector and to crack the contaminant cake collected thereon; and resuming the flow of the dirty gas stream into and through the tube. The present invention may also be employed in conjunction with a tube type dust collector having an auxiliary filter tube compartment so that full filtering can be continued while a preselected compartment is being cleaned.

DESCRIPTION OF THE PREFERRED EMBODIMENT

Figures 1, 2:
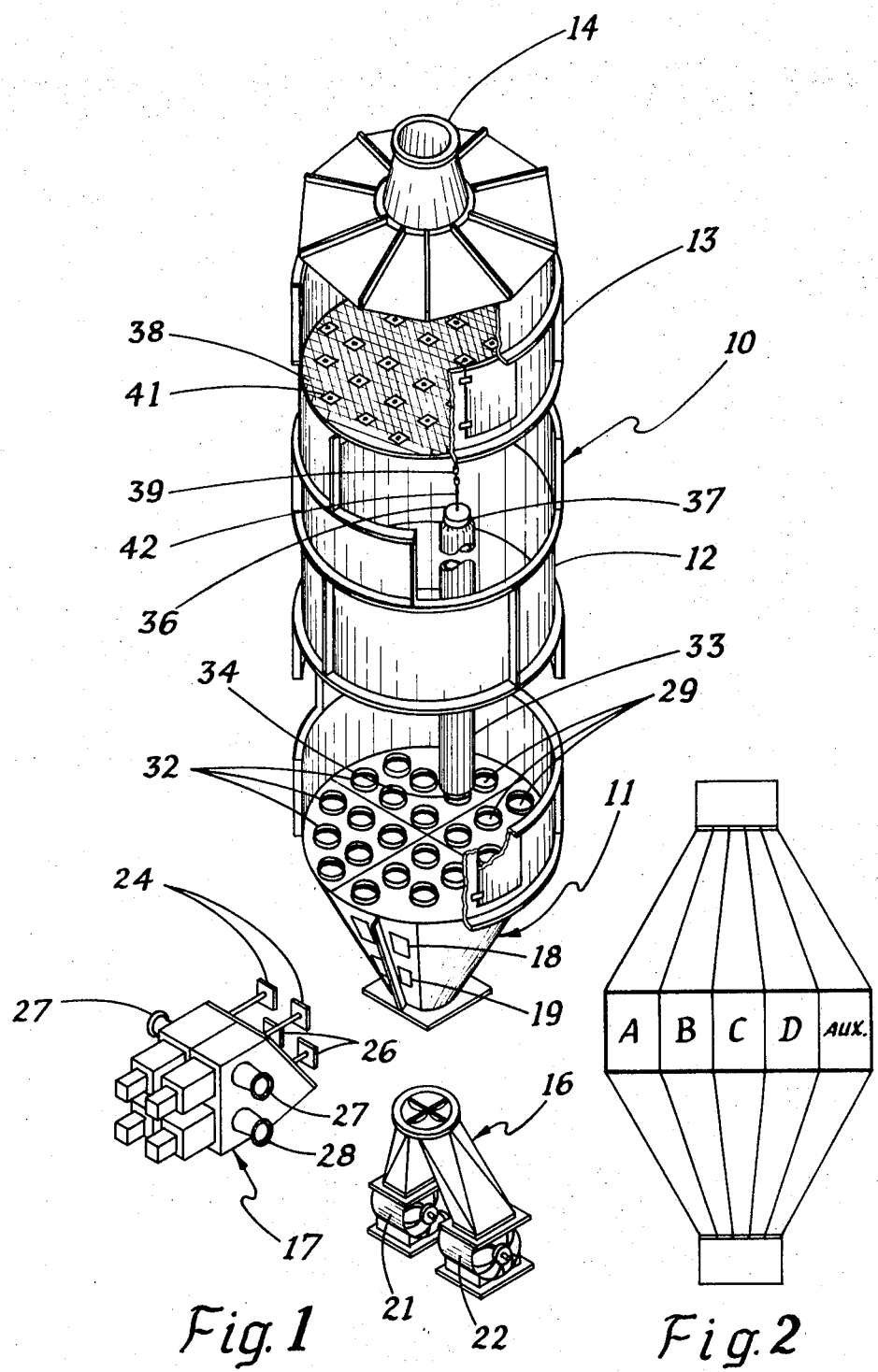
FIG. 1 is a partially broken exploded elevational view of a gas pervious fabric tubular collector in which the invention may be practiced.
FIG. 2 is a schematic diagram showing the use of an auxiliary compartment when employing the present invention.

Referring to FIG. 1 of the drawings tubular collector housing 10 is disclosed as including a dirty gas inlet section 11, tube section 12, clean gas outlet section 13 having a clean gas outlet 14, hopper section 16, and damper section 17. A suitable housing base support section (not shown) is provided to support the aforementioned housing 10. In the embodiment of the invention disclosed, dirty gas inlet section 11 is divided into four separate compartments by suitable partitions (not shown in detail) so that each compartment has a dirty gas inlet aperture 18, and a reverse gas outlet flow aperture 19. It is to be understood that the present invention is not to be considered as limited to the number of sections disclosed, the number of sections utilized depending upon such factors as the size of the unit, the number of tubes employed, and the particular results desired in a specific application. As shown schematically in FIG. 2, it is possible to have an auxiliary compartment which can be utilized while one of the other compartments is being cleaned. Such an auxiliary compartment allows full continuous flow of the dirty gas through the tube type collector while a preselected compartment is being cleaned.

Hopper section 16, which is positioned below dirty gas inlet section 11 in communicable relationship therewith, is arranged to communicate with each of the compartments in section 11, and, as disclosed, includes a pair of rotary valves 21 and 22 which can be timed to open and close in a preselected manner in accordance with the gas cleaning operations that are described hereinafter.

To control flow of a dirty gas stream through each of dirty gas inlet apertures 18 and into the separate compartments of dirty gas inlet section 11, solenoid controlled pneumatic damper sections 17 are provided. In the drawings only one damper section 17 capable of handling two compartments is disclosed. It is to be understood that a similar damper section (not shown) is provided for the other two compartments disclosed. Damper sections 17 each include a pair of primary dampers 24, each of which cooperates with a dirty gas inlet 18 of a compartment in section 11. In similar fashion damper sections 17 also are provided with a pair of secondary dampers 26, each of which controls the reverse outlet flow of gas through a gas reverse flow aperture 19 of a compartment in section 11. In this connection, it is to be noted that each damper section 17 is provided with a dirty gas inlet duct 27 upstream of dampers 24 and a gas reverse flow duct 28 downstream of dampers 26. A suitable blower mechanism (not shown) is provided to move dirty gas through duct 27 and apertures 18 into the compartments of section 11 and through the gas pervious fabric tubes of tube section 12. In like fashion, a suitable reverse blower mechanism (not shown) is provided to move clean gas in a reverse direction through the tubes of tube section 12, through the compartments of section 11 through reverse flow outlets 19 and through downstream ducts 28. It is to be understood that dampers 24 and 26 of each damper section 17 can be pneumatically actuated through a solenoid controlled pneumatic system in a novel preselected manner as described hereinafter.

Referring further to FIG. 1 of the drawings it can be seen that tube section 12 communicates with dirty gas inlet sections 11 through a plurality of apertures 29 disposed in header plate 31, extending across the lower portion of tube section 12. Each aperture 29 is surrounded by a thimble or sleeve 32 so that the lower end of a tube 33 can be fastened to such sleeve with the aid of a draw band 34 (not disclosed in detail). Tubes 33 which can be fabricated from any one of a number of suitable gas pervious materials and which advantageously are made from a fibrous glass material capable of resisting high temperatures are each closed at their upper ends by means of caps 36. The upper end of the tubes being fastened to the cap with the aid of a suitable draw band clamp 37. To maintain the tubes in vertically extending substantially parallel positions in tube section 12, horizontal support grating 38 is provided across the upper portion of tube section 12. Each tube 33 is suspended from support grating 38 through a chain 39 fastened at one end to a plate 41 carried on the support grating. The other end of each chain 39 is fastened to a spring 42 which in turn is fastened to the cap 36 on which an end of tube 33 is mounted. According to the present invention the method of operating the above described apparatus is as follows. During the filtering of contaminant particles from a dirty gas stream, dirty gas inlet duct 27 is open so that dirty gas may enter therethrough and pass into dirty gas inlet section 11, by passing through primary dampers 24 and dirty gas inlet aperture 18. From there the dirty gas passes through the plurality of apertures 29 into tubes 33. The gas passes through the sidewalls of the tubes leaving the contaminant particles on the inside thereof, and exits through clean gas outlet section 13. When the contaminant particles have accumulated on the inside surface of tubes 33 to a point where they cause a significant pressure drop, the tubes are isolated by compartments from the dirty gas stream and are cleaned. The cleaning cycle begins by energizing one of the primary dampers 24 for a preselected compartment which closes off its dirty gas inlet 18 to stop passage of the dirty gas stream through the compartment and through tubes 33 connected with the compartment. At this point the tubes are allowed to stand for a predetermined period of time with no gas passing therethrough. During this null period the static charges built up upon the fabric tube surfaces are allowed to dissipate to ground. Advantageously, the null period is in the range of between 15 minutes and about 1 hour with a null period about 30 minutes being most advantageous. It is to be understood that the null period will vary with the type of fabric materials used and with the existing ambient conditions. After the compartment to be cleaned has been isolated, and the charges have been allowed to dissipate, secondary damper 26 is moved to an open position to open aperture 19 corresponding with the compartment being cleaned and a reverse flow of cleaned gas under suitable pressure commenses. This reverse flow of cleaned gas may merely be the gas contained in the compartment to be cleaned being evacuated under vacuum. It is however to be understood that this reverse flow of cleaned gas is at a sufficient pressure and velocity to collapse tubes 33 communicating with the compartment. The length of time that the primary damper 24 is closed and the secondary damper 26 is open is preselectively controlled by timers. The collapse of tubes 33 cause the contaminant cake built up on the inside surfaces thereof to crack and then fall to the bottom of dirty gas inlet section 11, for subsequent removal. The position of dampers 24 and 26 of that section are then reversed with the primary damper 24 opening and the secondary damper 26 closing. Tubes 33 in that compartment then are reinflated and are back on stream. It is to be noted, that at this point it may be desirable to only partially reinflate tubes 33 in the compartment to be cleaned and again change the respective positions of dampers 24 and 26 to draw a vacuum on tubes 33 a second time. This partially reinflation and deflation can be repeated several times to effect more thorough cleaning of tubes 33. It is also to be noted that many times it is desirable to change the respective positions of dampers 24 and 26 very slowly or in a stepwise fashion to avoid snapping or popping of tubes 33. Ultimately damper 24 is fully opened and damper 26 is fully closed to again permit further treatment of the dirty gas by the cleaned tubes in the compartment. A second compartment may then be isolated and cleaned as described above. In like sequential fashion the tubes of the third and fourth compartments are cleaned and the entire overall cycle repeated as necessary. As shown in FIG. 2 it may be desirable to provide an auxiliary compartment which can be put on stream during the cleaning of a preselected compartment.

It should be noted that in accordance with the principal of this invention the cleaning cycle disclosed herein is particularly useful when the tubular filter apparatus is used to filter contaminant particles from the dirty gas stream leaving, for example, submerged arc furnaces, which may be producing ferro-silicon alloys, silicon metal, chromium silicide or other ferro-alloys, the gas stream of which contain contaminants having a major constituent of oxides of silicon.

Having described the invention what is claimed is:

1. A method of collecting contaminant particles from a dirty gas stream including the cycle steps of passing said gas stream through a system defined passageway which includes passing said gas stream into an open end of and through the walls of at least one gas pervious fabric tube in a tubular collector at a pressure and velocity sufficient to maintain said fabric tube in inflated form; collecting said contaminant particles from said dirty gas stream on the surface of the walls of said fabric tube and acquiring static electric charges thereon; thereafter cleaning said tube of said collector in cleaning cycle wherein said cleaning cycle comprises stopping the flow of said dirty gas stream into said fabric tubular collector by isolating said fabric tube from said incoming dirty gas stream when a cake of contaminant particles has collected on the surface of the walls thereof; terminating the flow of gas for a preselected null period of from about 15 minutes to about 1 hour to dissipate to ground static electrical charges built up on the walls of said fabric tube; passing a clean gas stream in a reverse direction through said isolated tube at sufficient pressure and velocity and for a sufficient time interval during the cleaning cycle to at least partially collapse said fabric tube of said tubular collector and to crack said contaminant cake collected thereon; allowing sufficient time for said contaminant cake to fall from said collecting surface of said tubular collector; and resuming the flow of said dirty gas stream into and through said tube.

2. The method of claim 1 wherein said null period is advantageously in the range of between about 15 minutes and about 1 hour.

3. The method of claim 1 wherein said null period is about 30 minutes.

4. A method of collecting contaminant particles from a dirty gas stream, said particles having a major constituent comprised of at least one oxide of silicon, said method including the cycle steps of passing said dirty gas stream through a system defined passageway which includes passing said gas stream into an open end of and through the walls of at least one pervious fabric tube in a tubular collector at a pressure and velocity sufficient to maintain said fabric tube in inflated form; collecting said contaminant particles in said dirty gas stream on the surface of the walls of said fabric tube and acquiring static electric charges thereon; thereafter, cleaning said tube of said collector in a cleaning cycle wherein said cleaning cycle comprises stopping the flow of said dirty gas stream into said fabric tubular collector by isolating said fabric tube from said incoming dirty gas stream when a cake of contaminant particles has collected on the surface of the walls thereof; terminating the flow of gas for a preselected null period of from about 15 minutes to about 1 hour to dissipate to ground static electrical charges built up on the walls of said fabric tube; passing a clean gas stream in a reverse direction through said isolated tube at sufficient pressure and velocity and for a sufficient time interval during the cleaning cycle to at least partially collapse said fabric tube of said tubular collector and to crack said contaminant cake collected thereon; allowing sufficient time for said contaminant cake to fall from said collecting surface of said tubular collector; and resuming the flow of said dirty gas stream into and through said tube.

* * * * *